United States Patent [19]

Hartlepp

[11] Patent Number: 4,846,335

[45] Date of Patent: * Jul. 11, 1989

[54] SORTER TILT MECHANISM

[75] Inventor: Karl H. Hartlepp, Burlington, Canada

[73] Assignee: Dominion Chain Inc., Stratford, Canada

[*] Notice: The portion of the term of this patent subsequent to Jul. 26, 2005 has been disclaimed.

[21] Appl. No.: 107,353

[22] Filed: Oct. 13, 1987

[30] Foreign Application Priority Data

Feb. 3, 1987 [CA] Canada ................................. 528887

[51] Int. Cl.⁴ ............................................. B65G 37/00
[52] U.S. Cl. ..................................... 198/365; 209/698
[58] Field of Search ............ 198/365, 370, 372, 476.1, 198/477.1, 482.1, 631, 802, 833, 795; 209/698, 912, 707; 104/204, 208, 211, 212, 214–218, 222, 224, 233

[56] References Cited

U.S. PATENT DOCUMENTS

| | | | |
|---|---|---|---|
| 2,609,086 | 9/1952 | McBride et al. | 198/833 X |
| 3,167,192 | 1/1965 | Harrison et al. | 198/365 X |
| 3,435,780 | 4/1969 | Czarnecki et al. | 198/833 X |
| 3,662,874 | 5/1972 | Muller | 198/365 |
| 3,669,245 | 6/1972 | Wooten et al. | 198/365 |
| 3,827,372 | 8/1974 | Laurent | 104/217 X |
| 3,848,728 | 11/1974 | Leibrick et al. | 198/833 X |
| 3,871,303 | 3/1975 | Woodling | 104/217 X |
| 4,004,681 | 1/1977 | Clewett et al. | 198/365 |
| 4,102,448 | 7/1978 | Wolbrink et al. | 198/365 |
| 4,233,907 | 11/1980 | Brown et al. | 198/833 X |
| 4,378,062 | 3/1983 | Macrum | 198/365 |
| 4,399,904 | 8/1983 | Canziani | 198/365 |
| 4,635,785 | 1/1987 | Prydtz | 198/365 |

Primary Examiner—Robert J. Spar
Assistant Examiner—Cheryl L. Gastineau
Attorney, Agent, or Firm—Barnes, Kisselle, Raisch, Choate, Whittemore & Hulbert

[57] ABSTRACT

A conveyor system for use in transporting cargo from a loading station to at least one selected location in the system including a track extending along a loading station and selected locations. A plurality of cars are provided and driven along the track for moving cargo. Each car has a tray and a tray support structure mounted pivotally below the tray for transverse angular movement between an upright position for carrying cargo on the tray and a tilted position for dumping the cargo at a selected location. An unloader has at least one stationary portion attached to the track at a selected location and mobile portions attached one to each of the cars. The stationary portion is movable between a disengaged position in which the stationary portions and mobile portions do not interact as the cars travel on the track, and an engaged position in which the stationary portion and mobile portion interact to tilt the tray and dump the cargo at a selected location.

11 Claims, 6 Drawing Sheets

SORTER TILT MECHANISM

This application is related to application Ser. No. 107,017, filed Oct. 13, 1987, and now U.S. Pat. No. 4,759,439 entitled "Drive Mechanism".

This invention relates to conveyor systems of the type having an endless chain of cars running on a track and more particularly to an unloader to unload cargo from the cars at predetermined locations along the track, the unloader being particularly useful to sort parcels and the like.

The present invention will be described with particular reference to an endless conveyor system made up of a plurality of cars carried on a track and moved by a drive mechanism along the track. The conveyor system includes at least one stationary portion at a predetermined location on the track and mobile portions attached one to each car. The stationary portion can be activated selectively to cooperate with the mobile portions to tilt and unload the cars at the locations. The unloader can also be used in other cargo carrying systems for similar purposes.

Conveyor systems are often used to distribute cargo to a number of locations about an endless track. The system includes a plurality of similar cars attached to one another to form an endless chain and each of the cars supports a tray on which cargo is carried. Conventional controls are used to have the cargo dumped off the trays at selected ones of the locations about the track, and this dumping usually depends on gravity. As the cars pass the locations some form of release mechanism causes the tray to fall into a tilted position so that the cargo falls off the tray. Clearly such an arrangement depends on the position of the cargo on the tray and also on the location of the centre of gravity of the cargo with respect to the tray. It would be possible for the weight of the cargo to interfere with the action under gravity and in extreme cases to retain the tray in a horizontal position so that the cargo stays on the tray. This clearly leads to uncertain reliability and possible damage to the system.

It is one of the objects of the present invention to provide a conveyor system which is reliable and which controls the tilting action of carrying trays to prevent uncertain actuation.

In one of its aspects the invention provides a conveyor system for use in transporting cargo from a loading station to at least one selected location in the system. The conveyor system includes a track extending longitudinally and passing the loading station and the selected locations, the track having first and second sides. A plurality of cars are provided on the track for moving the cargo along the track from the loading station to the selected locations, each car having a tray support structure and a tray attached to the structure carrying the cargo. The support structure is mounted pivotally below the tray for transverse angular movement between an upright position for carrying cargo on the tray and a tilted position for dumping the cargo at one of the selected locations. Drive means is attached to the track and engagable with the cars to drive the cars along the track and an unloader is included having at least one stationary portion attached to the track at a selected location and mobile portions attached one to each of the cars. The stationary portion is adjustable between a disengaged position in which the stationary Portions and mobile portions do not interact as the cars travel on the track, and an engaged position in which the stationary portion and mobile portion interact to tilt the tray and dump the cargo at the selected location. Each of the mobile portions has a part for interacting with the stationary portion attached to a first side of the track for tilting the tray support structure to the other side of the track.

The invention will be better understood with reference to the drawings, in which.

Figure 1:
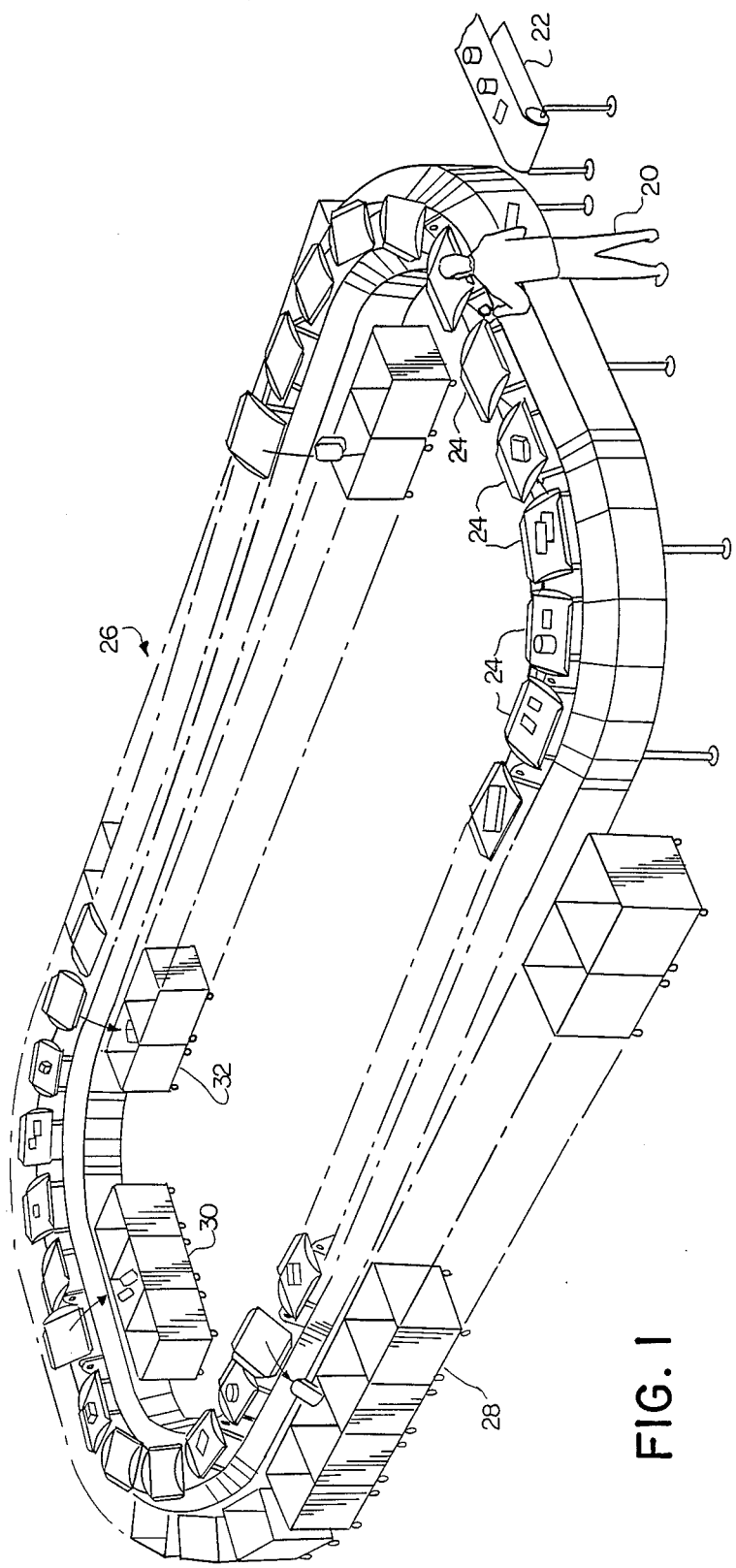
FIG. 1 is a perspective diagrammatic view of a preferred embodiment of an endless conveyor system made up of a plurality of cars in use to distribute parcels from a central loading station to selected locations around the system dependent upon the address information on the parcels, the conveyor system incorporating a drive mechanism and an unloader.

Reference is made firstly to FIG. 1 which shows diagrammatically a preferred embodiment of conveyor system to illustrate the type of arrangement with which the present invention can be used. The system includes an unloader which will be described with reference to subsequent drawings.

As seen in FIG. 1, an operator 20 is receiving parcels at a loading station from a belt conveyor 22 and placing them on selected tiltable trays 24 of an endless conveyor system indicated generally by the numeral 26. Each of the trays is associated with one of a series of cars connected to one another to make a conveyor. With suitable conventional controls, the trays can be selected or programmed to carry a parcel to one of several locations such as bins 28, 30 or 32 where the parcel is collected.

The unloader has mobile portions attached one to each of the cars and stationary portions for cooperating with the mobile portions to cause selected trays to tilt transversely at predetermined locations for dumping cargo at these locations. The cars then return to carry more parcels supplied by the operator 20.

Figure 2:
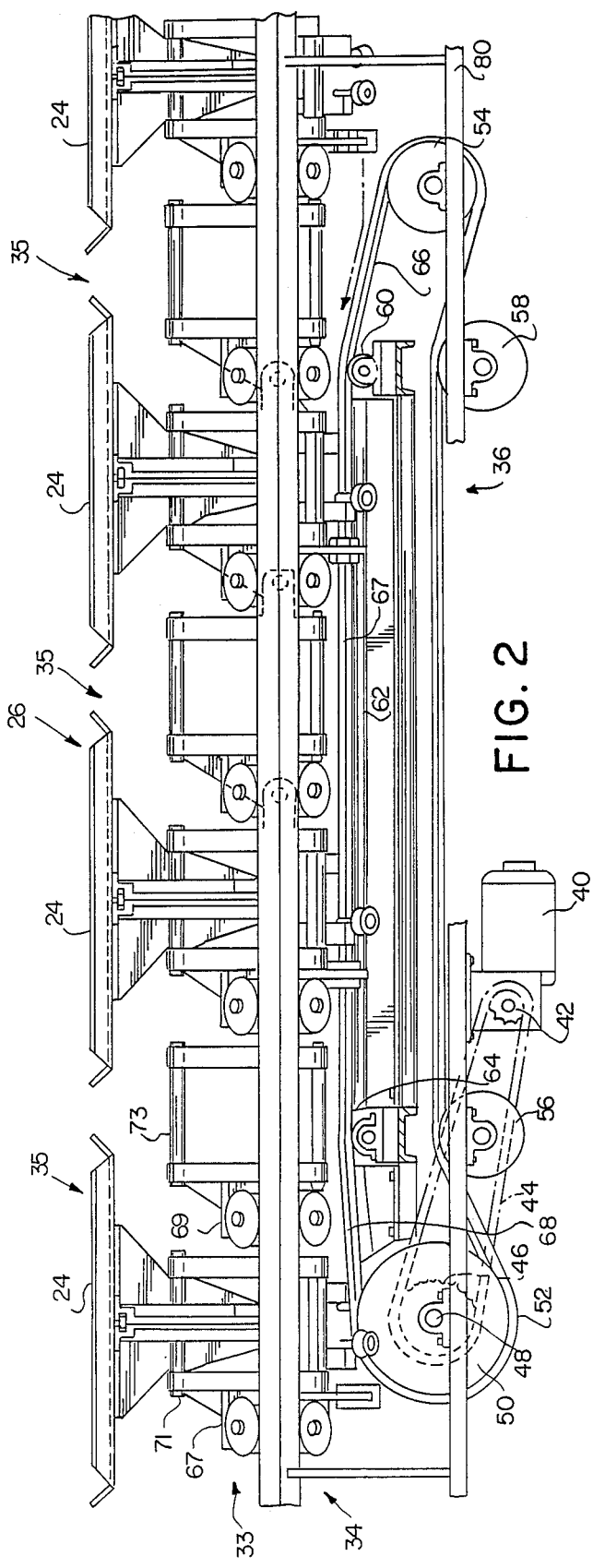
FIG. 2 is a side view of a section of the conveyor system and illustrating the drive mechanism and some of the cars used in the conveyor, each of the cars having one of the mobile portions of the unloader.

Reference is next made to FIG. 2 which illustrates a portion of the endless conveyor system 26. A conveyor 33 is made up of cars 35 and is carried on a track indicated generally by the numeral 34 which also supports a drive mechanism indicated generally by the numeral 36. The driving connection made between the cars of the conveyor 26 and the drive mechanism will be described more fully with reference to FIGS. 2 and 3. The drive mechanism 36 has a prime mover 40 which has an output sprocket 42 driving a chain 44 around a chain wheel 46. This chainwheel shares a shaft 48 with a pulley wheel 50 carrying a belt 52 so that the belt is driven when the prime mover is activated.

The belt 52 extends generally longitudinally under the endless conveyor between the pulley wheel 50 and a further pulley wheel 54 passing on its way over tensioning pulleys 56, 58 and then returning over a first upper pulley 60, a rubbing strip 62 and then over a second upper pulley 64. The pulleys 60, 64 and rubbing strip 62 maintain the upper run of the belt above the top extremity of the pulley 50 and expose it for engagement with the endless conveyor system as will be described. For the moment, it is significant to note that between the pulley 54 and pulley 60, there is an upwardly inclined ramp portion 66, a main portion 67 on the rubbing strip and, between pulley 64 and pulley 50 there is a downwardly inclined portion 68. The main portion 67 of the belt runs on the rubbing strip 62 longitudinally in parallel with the conveyor. The belt 52 is driven continuously if the conveyor is to move and the conveyor is stopped by deactivating the prime mover 40.

FIG. 2 also illustrates the make-up of each car. In this Fig. the cars are moving right to left and the leading car, which is exemplary of all of the cars, consists of first and second bogies 67, 69 and first and second chassis 71, 73, the chassis 71 carrying a tray 24. The chassis are connected to the bogies to form universal joints so that each chassis can move independently of the others while moving along the track attached to adjacent chassis. The details of the cars will be described more fully with reference to FIG. 3.

In larger conveyor systems, more than one drive system may be used and possibly a more extensive single system having greater power and possibly a different belt arrangement. However, the principal will remain the same as that described with reference to the present embodiment.

Figure 3:
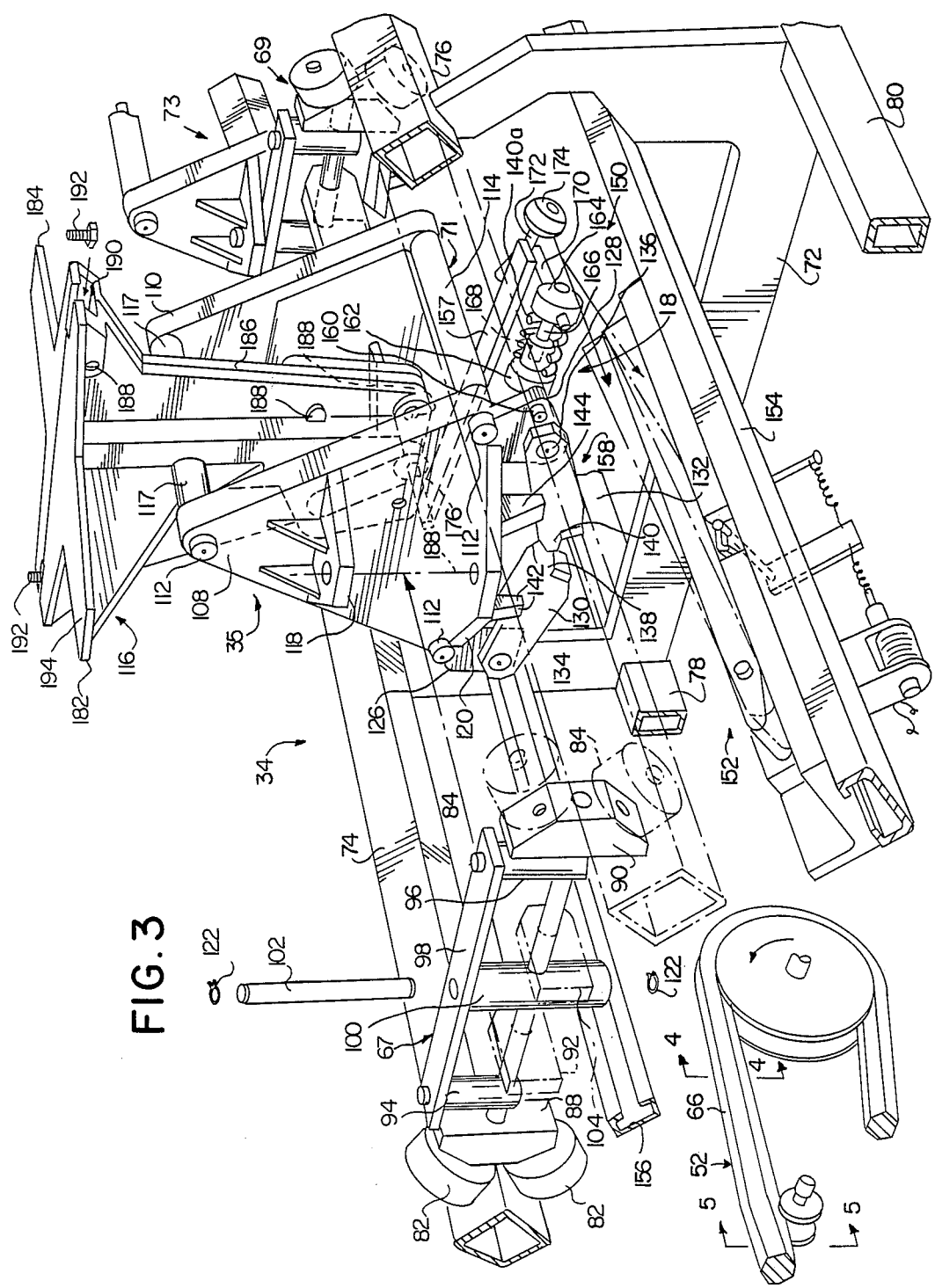
FIG. 3 is a perspective and exploded view of a part of a car shown to a larger scale than that used in FIG. 2.

Turning now to FIG. 3 which shows a part of a car 35 and track 34, it will be seen that the belt 52 presents the inclined ramp portion 66 to gripper mechanisms 70 as the cars of the conveyor move one at a time towards the drive mechanism. The conveyor is carried on track 34 which consists essentially of a series of frames 72 (one of which can be seen) to which is attached parallel rails 74, 76 and, below these rails, structural elements 78, 80 are provided to add rigidity. These elements are used to support the drive mechanism as can be seen by comparison with FIG. 2.

The rails 74, 76 are of square section with the sides lying at 45 degrees to the vertical. Inwardly facing surfaces provide runways for respective pairs of rollers 82, 84 associated with bogie 67 which is typical of all of the bogies used in the conveyor. The bogie 67 includes outboard support blocks 88, 90 formed suitably to carry the rollers 82 and 84 and are connected by a transverse round rod 92 which is also attached to end uprights 94, 96. These uprights are attached to respective ends of a crossbar 98 and a central hollow post 100 is also attached to the crossbar and to the rod 92 to receive an axle 102 The bogie is attached permanently to a preceeding second chassis by a pair of arms 104 associated with that chassis. The arms are free to rotate on the cylindrical rod 92 and the bogie is therefore located in relation to the preceeding chassis to move angularly with respect to the bogie in a vertical plane only.

The first chassis 71 is shown in FIG. 3 where it will be seen that this chassis has arms projecting to the second bogie 69 and consists essentially of a pair of generally triangularly shaped and similar end elements 108, 110 connected to one another at the apices by bolts 112, the lower ones of which pass through a pair of sleeves 114 (one of which is seen) and the other of which passes through a tray support structure 116 located centrally by a pair of short spacers 117. The upper bolt is arranged so that the tray support structure 116 can tilt sideways, as will be described more fully later. For the moment, this indicates that the conveyor carries trays which can be tilted using suitable structure to unload the tray at predetermined locations around the track.

Returning to the end element 108, it will be seen that it carries a pair of integral parallel flanges 118, 120 spaced apart vertically to engage about the ends of the bogie post 100 and drilled to receive the axle 102 which is retained in place by a pair of conventional circlips 122 adjacent its ends. Once this assembly is completed, the chassis 71 can rotate relative to the bogie in a horizontal plane so that in effect this chassis is articulated with respect to the previous chassis at a universal joint.

The first chassis 71 is followed by the second chassis 73. The second chassis is also made up of end plates and connecting bolts. It attaches to the bogies in the same way as chassis 71 and is noteworthy only because it is proportioned with the same length so that the space between every pair of bogies is the same. The result is a modular conveyor. Each car has two modules with one tray and one gripper mechanism 70. This permits for a short distance between successive articulated bogies to make for good cornering and to permit the use of relatively sharp bends in the track.

The gripper mechanism 70 mentioned previously with reference to the chassis 71 is carried on the end element 108. This element includes a pair of integral downwardly extending side projections 126, 128 from which depend respective dogs 130, 132. The dogs are attached by pivotal connections 134, 136 to the projections 126, 128 and are proportioned so that under the influence of gravity, nose portions 138, 140 will be in the positions shown ready to engage the ramp portion 66 of belt 52 as will be explained. The dogs are maintained in this position and prevented from falling further by the use of a shoulder (not seen) which engages the respective projections 126, 128. It will be clear from this view (and looking at dog 130) that the dog is thinned where it meets the pivotal connection 134 to provide a shoulder at the discontinuity between the thinned portion and the main body of the dog. This is a conventional technique for minimizing movement. A similar shoulder is of course provided on dog 132.

Downwardly projecting locating ribs 142, 144 are dependent from the underside of the flange 120. The ribs are spaced forwardly from a plane containing the forward surfaces of the projections 126, 128 sufficient to provide room for movement of the dogs between these projections and the ribs to stabilize the dogs.

Figure 5:
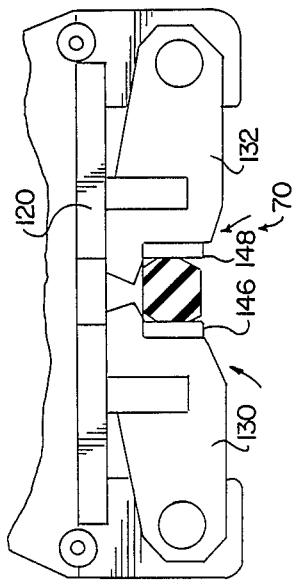
FIG. 5 (also drawn adjacent to FIG. 2) is a view similar to FIG. 4 and showing the car moved to the position indicated by line 5—5, of FIG. 3, the drive mechanism then being in engagement with the gripper mechanism.
Figure 4:
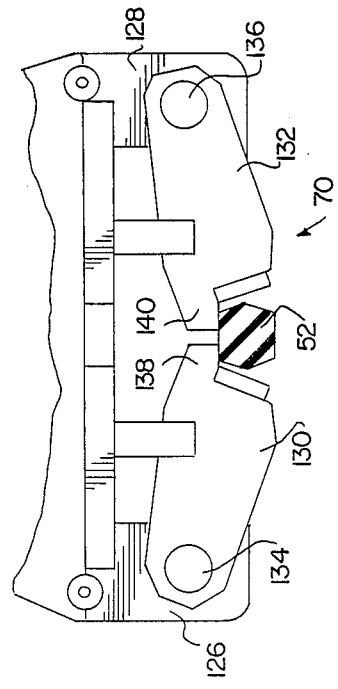
FIG. 4 (drawn adjacent to FIG. 2) is a sectional view shown generally on line 4—4 of FIG. 3 and including a portion of a car at that location, this view illustrating the drive mechanism about to engage with a gripper mechanism on the car.

Reference is next made to FIGS. 4 and 5 to illustrate the action of the gripper mechanism 70. As seen in FIG. 4, the belt 52 comes into contact with the nose portions 138, 140 and as the gripper mechanism continues forwardly, the dogs 130, 132 will be lifted about their pivotal connections 134, 136 by the action of the belt as it travels along the ramp portion 66 (FIG. 3). The motion will continue until the position shown in FIG. 5 is reached where a pair of wear pads 146, 148, defining engagement faces for gripping the belt 52, have come into engagement to either side of the hexagonally shaped belt. Further, the center of the belt is now above a line drawn between the centers of the pivotal connections 134, 136 so that there is an "over-center" action resulting in the dogs 130, 132 remaining in the position shown in FIG. 5 under the influence of the energy stored in the deformed belt. This means that the belt is effectively maintained in this position because, if anything, it wants to move upwardly resulting in a reduced force on the rubbing strip 62 (FIG. 2). However, further upward motion of the dogs is prevented because they are in engagement with the underside of the flange 120, so that the dogs remain in the FIG. 5 position as the car travels along the main portion of the belt above the rubbing strip.

In the position shown in FIG. 5, the gripper mechanism 70 causes the associated chassis and hence the endless conveyor to move with the belt. As seen in FIG. 2, the drive mechanism is proportioned so that there are at least two gripper mechanisms in contact with the belt at any one time. Once the gripper mechanism reaches the downwardly inclined portion 68, the belt breaks the over-center action of the dogs 130, 132 which then tend towards the position shown in FIG. 3, aided by gravitational force. The belt is then released to continue its travel around the pulley 50.

In general, the gripper mechanism 70 operates between a rest position shown in FIG. 4 and an engaged position shown in FIG. 5. In the rest position, the dogs hang freely, prevented from further downward motion by engagement with the downward projections 126 and 128, and in the engagement position, upward motion is prevented by the flange 120.

The gripper mechanism can be used on any wheeled structure supported by a track. Although the structural components may have to be modified for greater strength, the principle is common.

It should be noted that there is no preferred location for the gripper mechanism with reference to the length of the belt. The mechanism can attach at any location. The operation is quiet, simple and effective.

The unloader will now be described with reference initially to FIGS. 3 and 7. As mentioned previously, the unloader as far as the conveyor system is concerned, consists of mobile portions designated generally by the numeral 150 and attached one to each of the cars, and stationary portions designated generally by the numeral 152. The stationary portions are attached to one of a pair of stringers 154, 156 extending in parallel with the rails 74, 76 and attached to the frame members 72. Stationary portion 152 is typical of other similar portions which can be attached either to stringer 154 or stringer 166, depending upon whether or not the tray 24 (shown in FIG. 1) carried by the support structure 116 is to be tilted over rail 74 or alternatively over rail 76. In FIG. 3, the mobile portion will be affected on activation of the stationary portion 152 to cause the tray to tilt over the rail 74 as will be more fully described with reference to FIG. 8. Clearly, if a similar mechanism were placed on stringer 156, tilting would be in the other direction.

The parts of the mobile portion 150 used to combine with the stationary portion 152 in tilting the tray will be described. Similar structure will then be described for use in tilting the tray in the other direction.

Figure 7:
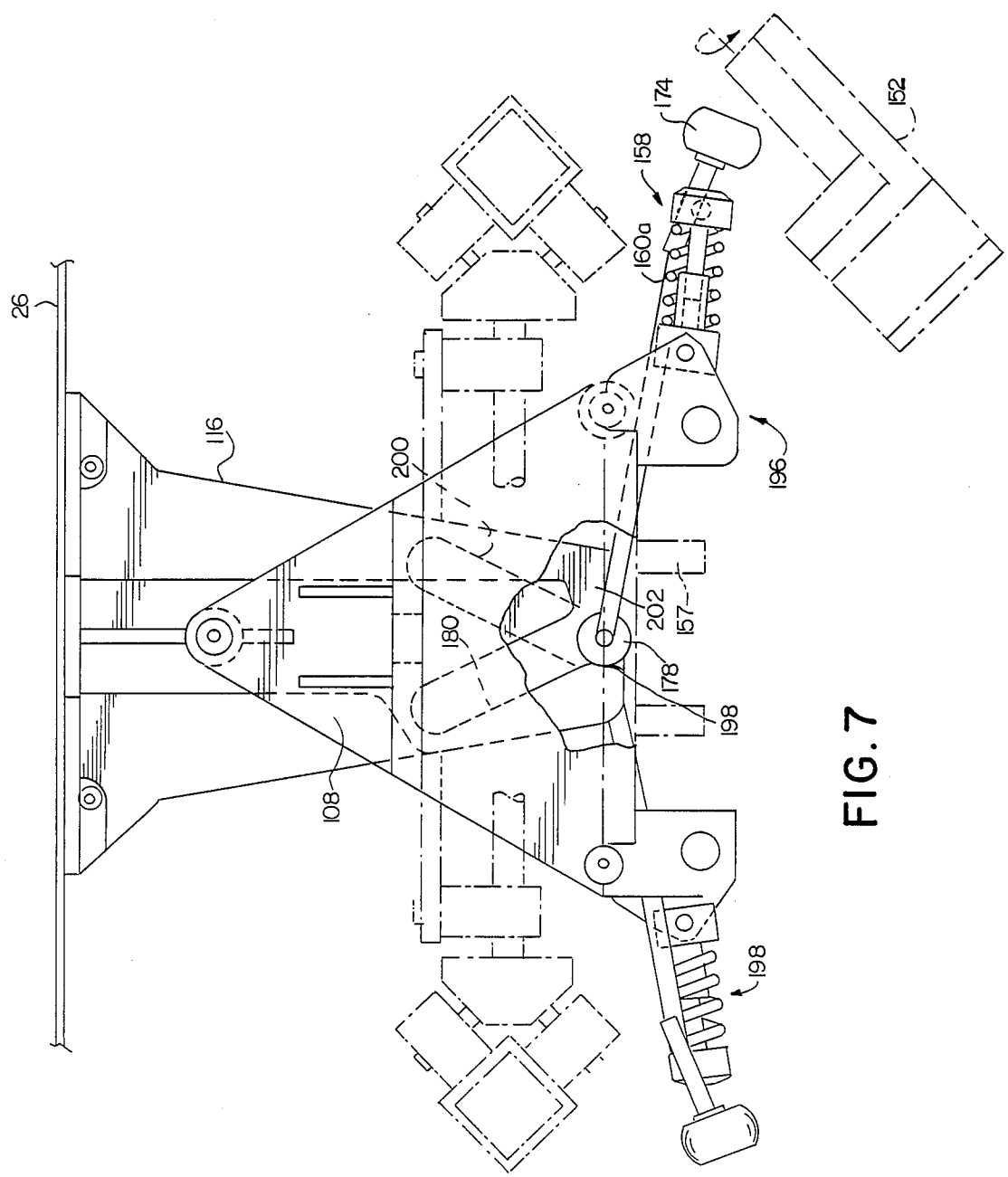
FIG. 7 is an end view of a car showing a mobile portion of the conveyor attached to the car with the car running along the track.
Figure 8:
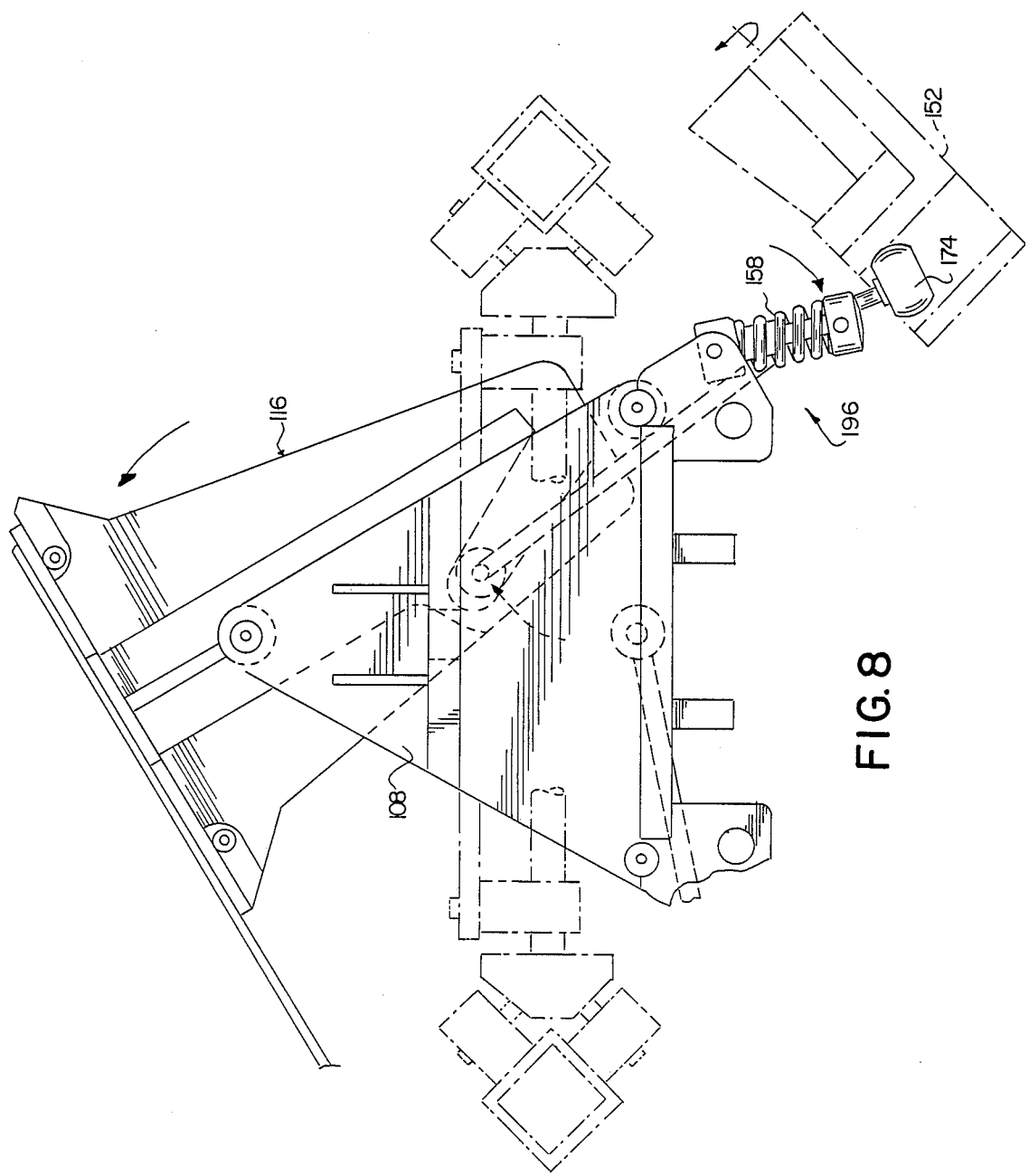
FIG. 8 is a view similar to FIG. 7 and showing the mobile portion engaging with the stationary portion of the unloader to tilt a tray on the car for unloading cargo.

As seen in FIGS. 3 and 7, an arm 157 is welded to the underside of the sleeve 114 which is free to rotate on the associated bolt 112. An over-center device 158 is suspended from a bolt 160 at the outward extremity of a projection 128 on the end element 108. The bolt is positioned longitudinally so that the over-center device 158 extends generally in parallel with the arm 157. In the position shown in FIG. 3, the axis of the bolt 160 is slightly below the axis of the bolt 112 so that the over-center device is angled upwardly with respect to the arm 157. A compression spring 140a extends between a base element 162 and an end piece 164 which is guided for movement with reference to the base element 162 by a sliding spindle 166 engaged in a tube 168 attached to the base element 162. A cross bar 170 extends between the end piece 164 and to the outer end of arm 157 to which it is welded. Consequently, as the arm moves from the upper position as shown in FIG. 3 to a downward position, the arm will pass through a projection of the axis of the bolt 160 so that the spring will be compressed and then relaxed to hold the arm in a lower position which is shown in FIG. 8. This over-center arrangement results in the arm having two natural positions, either the upper position shown in FIG. 3 or the lower position shown in FIG. 8.

The arm 157 terminates in an axle 172 which projects at an angle to the arm, terminating in a roller striker 174. At its inner end, the arm 157 has a longitudinally extending spindle 176 which projects into and carries a roller 178 engaged in a slot 180. This slot is formed in the tray support structure 116 and is angled with respect to the vertical so that when the arm 157 is rotated to move the striker roller 174 downwardly, the roller 178 at the inner end moves upwardly forcing the support structure 116 to rotate about the axis of bolt 112 to angle the structure towards the rail 74, thereby tilting cargo off the associated tray. Details of this movement will be described more fully with reference to FIGS. 7 and 8 after completing description of the tray support structure 116.

As seen in FIG. 3, the structure 116 consists of two similar parts 182, 184 meeting at a central dividing line 186. The first part 182 is associated with the parts of the mobile portion of the unloader, and the second part 184 is associated with similar unloader parts for tilting the tray towards the rail 76. The parts are held together by a series of screws 188 spaced around the parts for adequate strength of attachment. The resulting structure includes a pair of T-slots 190 (one of which can be seen) each receiving one of two bolts 192, for attachment of the tray. The tray is then supported on the parts which define a cross-shaped support surface 194. As mentioned previously, the part 182 defines the slot 180 which is angled upwardly and outwardly towards rail 74 and consequently, because the parts 182 and 184 are similar, there will be a slot in the part 184 which is angled upwardly and towards the rail 76.

Reference is now made to FIG. 7 to describe the operation of the unloader. As seen in FIG. 7, the mobile portion of the unloader consists of the parts designated generally by the numeral 196, and described previously with reference to FIG. 3, and the parts designated generally by the numeral 198. These parts are used to tilt the tray in the opposite direction as will be described.

Consider the action of the striker roller 174 in cooperation with the stationary portion 152 of the unloader. Clearly, the striker 174 will be maintained in the position shown by the influence of the spring 16 in the over-center device 158. This position will be maintained unless changed by a positive force on the striker 174. It can be seen in FIG. 7 that at the other end of the arm 157, the roller 178 is engaged with a vertical abutment 198 which will prevent the tray moving in an anti-clockwise direction as shown in FIG. 7. However, the roller is free at its other side, so that as far as this part of the mechanism is concerned, the tray support structure 116, together with tray 124 could rotate in a clockwise direction.

Because the mobile portion of the unloader has two similar parts 196, 198, the part 198 has a roller corresponding to roller 178 which cooperates with a slot 200 and a corresponding shoulder 202 to prevent clockwise rotation. As a result, with the two parts in the position shown in FIG. 7, the support structure is maintained in an upright position due to the engagement of the rollers with the abutments 198 and 202. This arrangement permits one of the rollers to take over and control the angular motion of the support structure 116. For instance, if the roller 178 moves upwardly it engages in the slot 180 and causes an anti-clockwise rotation taking the abutment 202 away from the other roller corresponding to roller 178. Similarly, if the other roller is actuated by movement of parts associated with it, it will move into the slot 200 and the abutment 198 will move away from the roller 78. Clearly, this movement will be under the control of the fixed portion of the unloader which will next be described with reference to FIG. 6.

Figure 6:
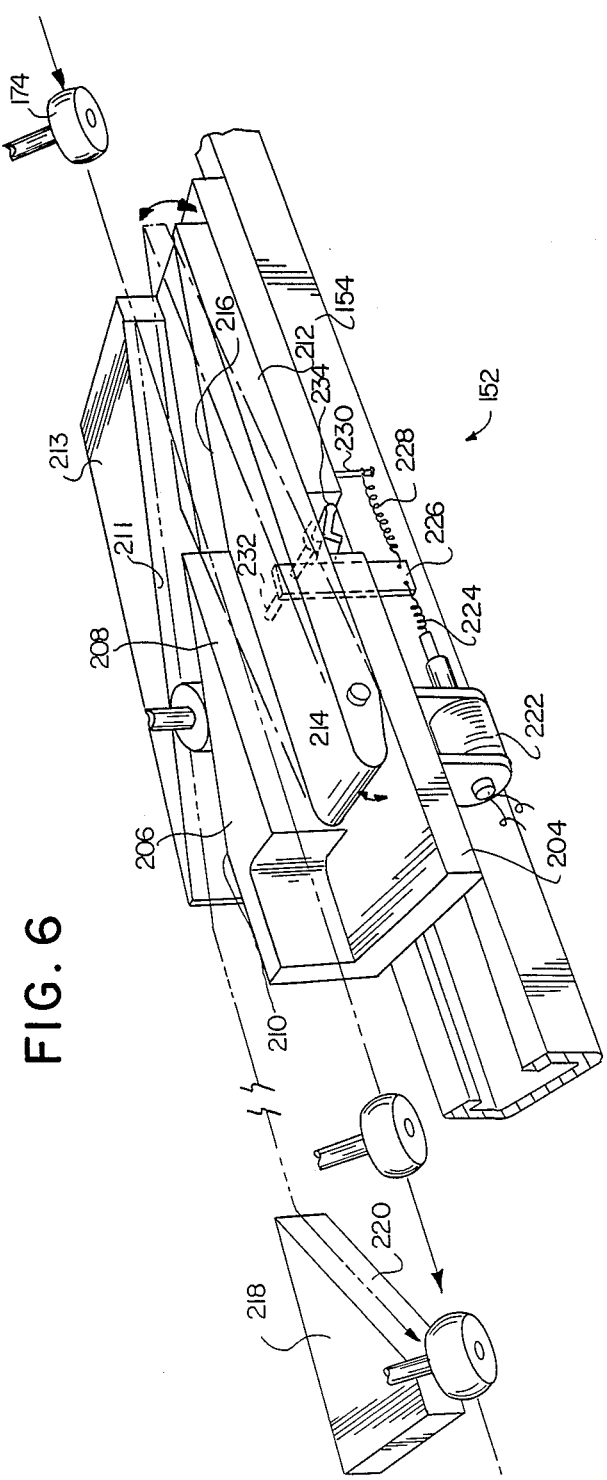
FIG. 6 is a perspective view of a stationary portion of the unloader, this portion being attached to the track of the conveyor system.

As seen in FIG. 6, the stationary portion 152 of an unloader is drawn rotated towards the viewer with reference to FIG. 3 in order to better describe the structure. The portion is attached to stringer 154 by a base plate 204 having an upstanding and wedge shaped guide 206. The guide has a longitudinally extending face 208 extending in parallel with the stringer 154 and a deflector face 210 which cooperates with a face 211 on a second guide 213 to control the direction of the striker roller 174 along the path defined between these two faces.

If the stationary portion 152 is not activated, then and above a switch plate 212. This switch plate normally lies on the base plate 204 and is located by a pivot pin 214 attached to the guide 206. The plate is shaped on its under side adjacent the pin to provide clearance so that it can tilt between the lowered position shown in full outline and the activated position shown in ghost outline. In the activated or upper position, a deflector face 216 is brought into the normal path of the striker roller 174 and into alignment with the face 210 of the guide 206. Consequently, with the switch plate 212 in the activated position, the roller striker 174 is deflected to move along the path between the guides 206 and 213 and this movement causes the tray to tilt as seen in FIG. 8. Because of the over-center action of the device 158 (FIG. 8), the roller striker 174 will tend to remain in the position shown in FIG. 8 so that it is necessary to provide a further guide 218, shown somewhat diagramatically, and of course attached to the stringer 154 or alternatively to an extension of the plate 204. This guide has a face 220 which the roller striker 174 engages causing the striker to return to its original path and resulting in the tray returning to the position shown in FIG. 7.

The switch plate 212 is activated in accordance with a control sequence by a solenoid 222 connected by a tension spring 224 to an upright lever 226 having a return spring 228 attached to an anchor pin 230. When activating the solenoid, the arm 226 is pulled towards the solenoid, so that in the failsafe condition the switchplate 212 remains in the lower position where it will not affect the roller striker. Once the arm is moved, it rotates a spindle 232 associated with a lever 234 having a crank on the underside of the plate 212 to elevate the plate as the arm rotates in a clockwise direction as drawn in FIG. 6.

Clearly, the preferred embodiment of the unloader could be modified to be operated in different ways. It is envisaged that in the embodiment shown, a conventional control system would be used to energize the solenoid 222, but of course manual operation could also be used as could any other suitable form of actuator.

Such changes are within the scope of the invention as described and claimed.

Although various materials could be used to manufacture the parts of the structure, it is conventional to use steel for the track and portions supporting the track. The cars and parts can be made either from conventional metals or from moulded engineered plastic. For instance the end elements 108 and 110 as well as the parts forming the tray support 116 can be of engineered synthetic plastics such as glass fibre reinforced acrylobutadienestyrene, (abs).

The embodiments of the invention in which an exclusive property or privilege is claimed are defined as follows:

1. A conveyor system for use in transporting cargo from a loading station to selected locations in the system, the conveyor system comprising:
    a track extending longitudinally and passing the loading station and the selected locations, the track having first and second sides and each of the selected locations being located at one or the other sides of the track;
    a plurality of cars on the track for moving the cargo along the track from the loading station to the selected locations, each car having a tray support structure and a tray attached to the structure carrying the cargo, the support structure being mounted pivotally about a central longitudinal axis below the tray for transverse angular movement between an upright position for carrying cargo on the tray and tilted positions for dumping the cargo to one or the other side of the track at the selected locations;
    drive means attached to the track and engagable with the cars to drive the cars along the track;
    an unloader having stationary portions each attached one of the sides of the track at the selected locations and mobile portions attached one to each of the cars, each of the stationary portions being adjustable between a disengaged position in which the stationary portions and mobile portions do not interact as the cars travel on the track, and an engaged position in which the stationary portions and mobile portions interact to tilt the tray and dump the cargo at said selected locations; and
    each of the mobile portions having two parts, the first part for interacting with a said stationary portion attached to a first side of the track to tilt the tray support structure to the second side of the track and the second part for interacting with another stationary portion attached to the second side of the track to tilt the tray support to the first side of the track,
    the tray structure including a pair of abutments facing respectively towards the first and second sides of the track and located centrally below said central axis, and in which each of the parts of the mobile portions includes means engaging one the abutments to retain the support structure in said upright position until one or the other of the said parts of the mobile portions interacts with one of the stationary portions to move the support structure to a tilted position, the engaging means comprising a pair of rollers, one adjacent each of the abutments.

2. A conveyor system as claimed in claim 1 in which the support structure includes a pair of slots extending upwardly one from each of the abutments for trapping an associated one of the rollers as the associated part of the mobile portion interacts with the stationary position to tilt the tray.

3. A conveyor system for use in transporting cargo from a loading station to at least one selected location in the system, the conveyor system comprising:

a track extending longitudinally and passing the loading station and the selected locations, the track having first and second sides;

a plurality of cars on the track attached to one another in a continuous loop, each car having a first chassis and a second chassis, a first bogie leading the first chassis and a second bogie leading the second chassis, the space in between any one bogie and the next bogie being substantially constant, tray supports mounted for movement between an upright position and a tilted position on respective first chassis;

drive means attached to the track and engagable with the cars to drive the cars along the track;

an unloader having at least one stationary portion attached to the track at a selected location and mobile portions attached one to each of the cars, the stationary portion being adjustable between a disengaged position in which the stationary portions and mobile portions do not interact as the cars travel on the track, and an engaged position in which the stationary portion and mobile portion interact to tilt the tray and dump the cargo at the selected location; and the drive means comprising a drive element extending longitudinally below the track and having an upwardly inclined ramp portion, a main portion extending in parallel with the track and leading from the ramp portion, and a downwardly extending portion leading from the main portion;

means adapted to drive the cars each that the main portion moves at a speed equal to that at which the cars are intended to move; and gripper mechanisms attached to the cars for engagement with the element, the gripper mechanisms including gripper means movable vertically upwards from a rest position to an engaged position and including an engagement means for meeting the element at the ramp portion so that as the wheel structure moves along the track, the element moves the gripper means into the engaged position where the gripper means is locked on the element to move with the element.

4. A conveyor system as claimed in claim 3 in which the drive element is a continuous belt.

5. A conveyor system as claimed in claim 4 in which the gripper means includes a pair of dogs arranged to grip the belt automatically as the cars travel over the ramp portion to receive driving forces from the belt as the cars travel with the belt along the main portion.

6. A conveyor system as claimed in claim 3 in which the gripper means comprises a pair of dogs, a pair of pivotal connections by which the respective dogs are suspended for pivotal movement between the rest position and the engaged position, the axes of the pivotal connections being parallel to said main portion and the dogs having opposing engagement faces and overhanging nose portions so that movement of the cars past the ramp portion of the drive element results in the drive element engaging the nose portions and lifting the dogs towards the engagement position, which movement continues until the dogs are in the engagement position with the cars above said main portion to drive the cars with the drive element.

7. A conveyor system for use in transporting cargo from a loading station to selected locations in the system, the conveyor system comprising:

a track extending longitudinally and passing the loading station and the selected locations, the track having first and second sides and each of the selected locations being located at one or the other sides of the track;

a plurality of cars on the track for moving the cargo along the track from the loading station to the selected locations, each car having a tray support structure and a tray attached to the structure carrying the cargo, the support structure being mounted pivotally about a central longitudinal axis below the tray for transverse angular movement between an upright position for carrying cargo on the tray and tilted positions for dumping the cargo to one or the other side of the track at the selected locations;

drive means attached to the track and engagable with the cars to drive the cars along the track;

an unloader having stationary portions each attached one of the sides of the track at the selected locations and mobile portions attached one to each of the cars, each of the stationary portions being adjustable between a disengaged position in which the stationary portions and mobile portions do not interact as the cars travel on the track, and an engaged position in which the stationary portions and mobile portions interact to tilt the tray and dump the cargo at said selected locations; and each of the mobile portions having two parts, the first part for interacting with a said stationary portion attached to a first side of the track to tilt the tray support structure to the second side of the track and the second part for interacting with another stationary portion attached to the second side of the track to tilt the tray support to the first side of the track, each of the parts of the mobile portions including;

an arm mounted on the car for pivotal movement about a longitudinal axis and having outer and inner ends, striker means at the outer end of the arm to interact with the stationary portion to move the outer end of the arm between a first position in which the support structure is vertical and a second position in which the support structure is tilted, and engagement means at the inner end;

a pair of abutments on the support structure in contact with the engagement means to retain the support structure in an upright position with the arms of the parts of the mobile portion in said first position, the engagement means comprising a pair of rollers, one adjacent each of the abutments, and in which the support structure includes a pair of slots extending upwardly one from each of the abutments for trapping an associated one of the rollers as the associated parts of the mobile portion interacts with the stationary portion to tilt the tray.

8. A conveyor system for use in transporting cargo from a loading station to selected locations in the system, the conveyor system comprising:

a track extending longitudinally and passing the loading station and the selected locations, the track having first and second sides and each of the selected locations being located at one or the other sides of the track;

a plurality of cars on the track for moving the cargo along the track from the loading station to the selected locations, each car having a tray support structure and a tray attached to the structural carrying the cargo, the support structure being mounted pivotally about a central longitudinal axis below the tray for transverse angular movement between an upright position for carrying cargo on the tray and tilted positions for dumping the cargo to one or the other side of the track at the selected locations;

drive means attached to the track and engageable with the cars to drive the cars along the track;

an unloader having stationary portions each attached one of the sides of the track at the selected locations and mobile portions attached one to each of the cars, each of the stationary portions being adjustable between a disengaged position in which the stationary portions and mobile portions do not interact as the cars travel on the track, and an engaged position in which the stationary portions and mobile portions interact to tilt the tray and dump the cargo at said selected locations; and each of the mobile portions having two parts, the first part for interacting with a said stationary portion attached to a first side of the track to tilt the tray support structure to the second side of the track and the second part for interacting with another stationary portion attached to the second side of the track to tilt the tray support to the first side of the track, each of the parts of the mobile portions including;

an arm mounted on the car for pivotal movement about a longitudinal axis and having outer and inner ends, striker means at the outer end of the arm to interact with the stationary portion to move the outer end of the arm between a first position in which the support structure is vertical and a second position in which the support structure is tilted, and engagement means at the inner end;

a pair of abutments on the support structure in contact with the engagement means to retain the support structure in an upright position with the arms of the parts of the mobile portion in said first position;

said engagement means engaging said abutments for trapping an inner end of an arm as the associated part of the mobile portion interacts with the stationary portion to tilt the tray.

9. The conveyor system set forth in claim 8 including an over center device yieldingly supported on said arm such that the outer end of said arm has said first portion and said second position.

10. The conveyor system set forth in claim 1 including an over center device yieldingly supported on said arm such that the outer end of said arm has said first position and said second position.

11. The conveyor system set forth in claim 7 including an over center device yielding supported on said arm such that the outer end of said arm has said first position and said second position.

* * * * *